US010054682B2

(12) United States Patent
Baumgartel et al.

(10) Patent No.: US 10,054,682 B2
(45) Date of Patent: Aug. 21, 2018

(54) SENSOR DEVICE AND METHOD FOR RECORDING AT LEAST ONE CONTACT EVENT ON A VEHICLE

(71) Applicant: Hella KGaA Hueck & Co., Lippstadt (DE)

(72) Inventors: Klaas Hauke Baumgartel, Delmenhorst (DE); Thomas Niemann, Delmenhorst (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 205 days.

(21) Appl. No.: 14/873,976

(22) Filed: Oct. 2, 2015

(65) Prior Publication Data

US 2016/0097854 A1 Apr. 7, 2016

(30) Foreign Application Priority Data

Oct. 2, 2014 (DE) .................. 10 2014 014 389

(51) Int. Cl.
*G01S 15/00* (2006.01)
*G01S 15/93* (2006.01)
*G01S 7/521* (2006.01)
*G01S 7/539* (2006.01)

(52) U.S. Cl.
CPC ............ *G01S 15/931* (2013.01); *G01S 7/521* (2013.01); *G01S 7/539* (2013.01); *G01S 2015/932* (2013.01); *G01S 2015/938* (2013.01)

(58) Field of Classification Search
CPC .................................................. G01P 15/0975
See application file for complete search history.

(56) References Cited

U.S. PATENT DOCUMENTS

2015/0006037 A1\* 1/2015 Ghannam ........... B60R 21/0136
701/45

FOREIGN PATENT DOCUMENTS

| DE | 10034524 A1 | 1/2002 |
| DE | 102004014053 A1 | 10/2005 |
| DE | 102006030847 B3 | 10/2007 |
| DE | 102007002737 A1 | 7/2008 |
| DE | 102011121456 A1 | 6/2013 |

\* cited by examiner

*Primary Examiner* — Hovhannes Baghdasaryan
(74) *Attorney, Agent, or Firm* — Muncy, Geissler, Olds & Lowe, P.C.

(57) ABSTRACT

With a sensor device for detecting at least one contact event on a vehicle, in particular a motor vehicle, with at least one impact sound sensor for detecting at least one impact sound signal, at least one impact sound sensor comprises at least one signal-transferring connection to at least one signal processing means already existing in the vehicle and associated with at least one other sensor means. With this arrangement at least one impact sound sensor comprises an impact-sound-transmitting connection to a section of the outer shell of the vehicle. This allows contact events on the vehicle to be detected.

7 Claims, 3 Drawing Sheets

SENSOR DEVICE AND METHOD FOR RECORDING AT LEAST ONE CONTACT EVENT ON A VEHICLE

Figure 1:
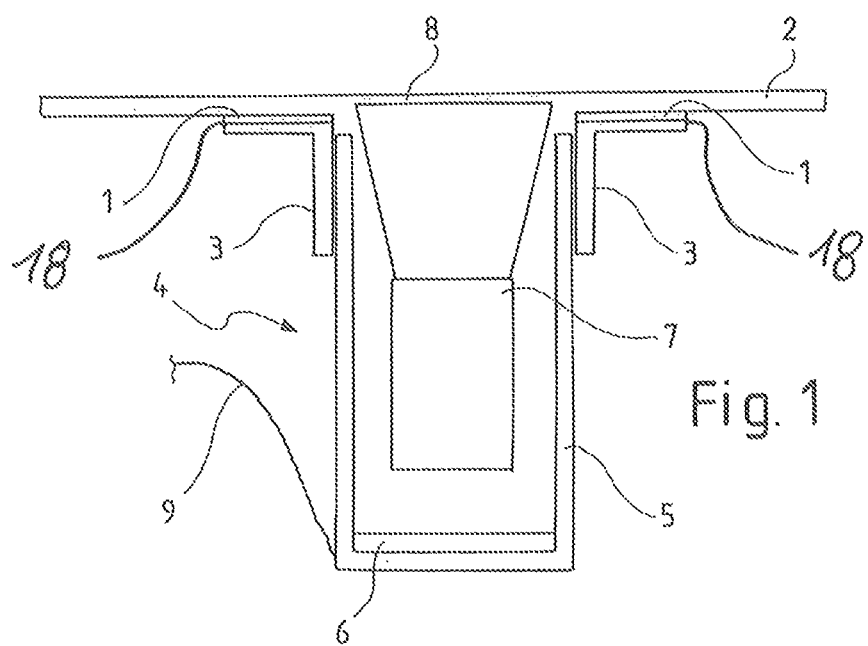

The invention relates to a sensor device for recording at least one contact event on a vehicle, in particular a motor vehicle, with at least one impact sound sensor for detecting at least one impact sound signal. Furthermore the invention relates to a method for recording at least one contact event on a vehicle, in particular a motor vehicle, with at least one sensor means for detecting at least one impact sound signal. Moreover the invention relates to a vehicle, in particular a motor vehicle, with a device according to the invention.

Devices and methods for detecting contact events such as accident-related deformations are known and are used in the automotive field. The DE 100 34 524 A1 has disclosed a method and a device for detecting an accident-related deformation of at least one component of a motor vehicle. This involves detecting an impact sound frequency spectrum resulting from the stimulation of a component with a defined repeating frequency pulse. A significant change in the impact sound frequency spectrum compared to a previously recorded impact sound frequency spectrum is interpreted as an accident-related deformation of the stimulated component.

Piezo-electric elements may, for example, be used as impact sound sensors. These are usually positioned at locations of the vehicle structure, which are very frequently prone to damage. The problem with installing piezo-electric elements is that these must be attached to the steel contour directly behind the vehicle outer shell. In most cases these areas are very difficult to access resulting in a highly time-consuming and very costly assembly operation. High-quality gluing of the piezo-electric elements is particularly difficult to achieve. Moreover installing the wiring of the respective sensor elements in the outer areas is very cumbersome, i.e. retrofitting of the sensor elements in a motor vehicle including their subsequent wiring is not possible without spending an exorbitant amount of time on it.

The invention is based on the requirement to propose a sensor device with which contact events on a vehicle can be detected by measuring impact sound, and where easy assembly, in particular retrofitting of the sensor device into an existing vehicle, is made possible.

This requirement is met by a device, method, and vehicle with the characteristics of the present claims.

With a sensor device for detecting at least one contact event on a vehicle, in particular a motor vehicle, with at least one impact sound sensor for detecting at least one impact sound signal, provision is made according to the invention, for the at least one impact sound sensor to comprise at least one signal-transferring connection to at least one signal processing means already present in the vehicle and associated with at least one other sensor means, for at least one impact sound sensor to comprise at least one impact-sound-transmitting connection to at least one section of the outer shell of the vehicle, for at least one already existing signal processing means to be associated with at least one ultrasound sensor, for the ultrasound sensor to comprise at least one mounting part for attaching the ultrasound sensor to an area of the outer shell of a vehicle and for the impact sound sensor to be arranged between the mounting part and the outer shell of the vehicle.

The impact sound sensor may be provided for the purpose of continuously recording the impact sound signal issued by a section of the outer shell of a vehicle and of forwarding it to a signal processing means for further evaluation. The wiring of impact sound sensors, especially in the outer areas of the vehicle outer shell, is very cumbersome, so that it is favourable to utilise already existing wiring. For example, an impact sound sensor can be connected to an already existing sensor system. By utilising already existing wiring, expenditure in terms of labour is considerably less, leading to a cost advantage and thus permitting to retrofit the impact sound sensor system into an existing vehicle in as economical a manner as possible. Apart from wiring an already existing sensor system it is also possible to utilise an already existing signal processing means for further processing of the impact sound signals. This may, for example, be a central computer node in the vehicle. In order to record the impact sound signals of a component of a vehicle, the impact sound sensor must have a impact-sound-transmitting connection to this component. This impact sound signal of an area of the outer shell of the vehicle may for example be recorded by an impact sound sensor on the side of the vehicle outer shell facing the passenger compartment. If an object makes contact with the vehicle outer shell, an impact sound signal is generated, which is forwarded via the outer shell of the vehicle so that when several impact sound sensors are distributed across the inside of the outer shell of the vehicle, this contact-making can be detected in the entire area of the vehicle outer shell. In particular the locations where impact sound sensors are placed can be selected such that the area relevant to monitoring is completely covered and that access to these locations is such that retrofitting of the impact sound sensors is possible. At least one already existing signal processing means is associated with an ultrasound sensor. The ultrasound sensor in particular, may be an ultrasound distance sensor, which is for example arranged on the bumper of a motor vehicle. In particular this may be an ultrasound sensor of a parking assistance system, such as used for example in detecting the distances to objects such as parking cars. The impact sound sensors may be connected to the ultrasound distance sensors and the raw data issued by the impact sound sensors may, for example be pre-processed by the signal processing means of the ultrasound distance sensors, from where they are then forwarded to a central control device. Here the wiring, in particular that of the ultrasound distance sensor, may be utilised.

The ultrasound sensor comprises at least one mounting part for attaching the ultrasound sensor to an area of the outer shell of a vehicle, and the impact sound sensor is arranged between the mounting part and the outer shell of the vehicle. The ultrasound sensors may, in particular, be ultrasound distance sensors of a parking assistance system. In most cases the ultrasound distance sensors are arranged along the outer contour of the front bumper and rear bumper/the mudguards. An ultrasound distance sensor may comprise a piezo-electric element for recording and emitting an ultrasound signal as well as a corresponding evaluation unit for signal processing. Moreover the ultrasound distance sensors may be connected with a central computer unit via cabling, and the ultrasound distance sensors may also be connected among each other via cables. The ultrasound distance sensors may comprise a mounting part for their attachment to an area of the bumper. For example, the ultrasound sensors may be attached via this mounting part to the inside of a bumper or a mudguard. An ultrasound distance sensor may e.g. comprise a housing, which is cylindrically shaped at least in sections, which surrounds the ultrasound distance sensor, and the mounting part may for example comprise a connection to the cylindrical shell and to the inside of the outer shell of the vehicle. The impact sound sensor may be arranged between the mounting part and the outer shell of the motor vehicle. The impact sound sensor may, for example, be configured as a piezo-electric foil, which is placed between the mounting part and the outer shell of the vehicle. To this end the piezo-electric foil may, for example, comprise double-sided adhesive surfaces enabling it to also function as a connecting material. Apart from a double-sided adhesive connection of the piezo-electric foil, there may also be other ways in which the mounting is connected with the impact sound sensor element. This type of arrangement results in a particularly time-efficient type of assembly. The impact sound sensors of a parking assistance system are distributed across the bumpers/the mudguards of a motor vehicle in such a way as to cover the monitoring of the area of the outer shell of the vehicle, in which the majority of contact events, such as hitting an object during parking, occur.

In a further development of the invention the impact sound sensor comprises at least one impact-sound-transferring connection to at least one bumper and/or mudguard of a vehicle. Due to a impact-sound-transferring connection to at least one bumper or at least one mudguard, in particular to both bumpers of the motor vehicle, a large area of the outer shell of the motor vehicle can be monitored. The bumpers/the mudguards are relatively easily accessible, allowing the sensor devices along the bumpers to be subsequently attached. The impact sound sensors may for example be realised as foils, allowing the foils to be glued to the inside of the respective bumper.

In one embodiment of the invention the ultrasound sensor comprises at least one housing part, the housing part comprises an impact-sound-transferring connection to the outer shell of the vehicle and the impact sound sensor comprises an impact-sound-transferring connection to the housing part. The ultrasound sensor may be an ultrasound distance sensor of a parking assistance system. These ultrasound distance sensors are normally arranged on the inside of the mudguards/the bumpers. The components of the ultrasound distance sensors may be surrounded by a housing part. A housing part may for example be cylindrically shaped and be attached, via the mounting parts of the ultrasound distance sensors, to the inside of the outer shell of the vehicle. The mounting parts constitute a impact-sound-transferring connection of the housing part to at least one area of the outer shell of the vehicle. An impact sound sensor may comprise a connection to the housing part, e.g. the impact sound sensor in the form of a piezo-electric foil may be glued to the inside of the housing part. If a contact event occurs in the respective part of the outer shell of the vehicle, the impact sound being created is transmitted from the outer shell to the housing part and can be detected here by the impact sound sensor. This type of arrangement results in a particularly simple installation of the impact sound sensors because these can be assembled together with the ultrasound distance sensors. Alternatively the impact sound sensor may be mounted to an electronic component, e.g. a signal processing means of the ultrasound distance sensor, wherein the electronic component comprises an impact-sound-transferring connection to the housing part, for example to the inside wall of the housing part.

In a further embodiment of the invention the impact sound sensor is formed from a piezo-electric foil, and the piezo-electric foil comprises at least two spatially separated areas, wherein at least one of the spatially separated areas is sensorily active. Due to the fact that the impact sound sensor is configured as a piezo-electric foil, it can be arranged between the mounting and the inside of the outer shell of the motor vehicle. The piezo-electric foil comprises at least two, preferably three spatially separated, sensorily active areas. Due to the provision of three sensory areas it is possible to detect e.g. the direction from which an impact sound signal is incident on the impact sound sensor.

In a further development of the invention the impact sound sensor comprises a rotation-symmetric cross-section, and the sensorily active areas are arranged on the cross-section in an alternating manner. The impact sound sensor comprises a rotation-symmetric, in particular circular cross-section. Due to the preferably circular cross-section the impact sound sensor, for example in the form of a piezo-electric foil, can be inserted between the mounting part of an ultrasound distance sensor and the inside of the outer shell of a vehicle. The housing, in which an ultrasound distance sensor is arranged, may be of circular cross-section, so that the mounting part also is of circular cross-section, and shape and size of the piezo-electric foil can therefore be easily adapted to it. In particular the impact sound sensor may comprise an opening, which is arranged symmetrically about the centre of the circular cross-section. This opening may, in particular, be adapted to the cross-section and the size of the housing of the ultrasound distance sensor, so that the piezo-electric element of the ultrasound distance sensor may for example extend right through the opening as far as the outer contour of the bumper. The sensorily active areas and the sensorily inactive areas are arranged on the cross-section in an alternating manner. A sensorily active area thus follows upon an inactive area, so that two sensorily active areas are spatially separated from each other. This spatial separation makes it possible to determine the direction, from which an impact sound signal is incident upon the impact sound sensor.

In a further development of the invention the impact sound sensor comprises at least one electrically contactable surface, the ultrasound sensor comprises at least one electrically contactable area, and an electric contact is established between the impact sound sensor and the ultrasound sensor. The electric contacts may for example be arranged in the sensorily inactive areas of the impact sound sensor. Preferably the shape and size of the cross-section of the impact sound sensor is adapted to the shape and size of the cross-section of the housing of the ultrasound distance sensor. In particular the mounting part of the ultrasound sensor may comprise electrically contactable areas, which become connected with the electrically contactable areas of the impact sound sensor, when the ultrasound sensor and the mounting part are brought into contact with each other. Alternatively the ultrasound sensor may comprise other electric contacts, which can be brought into contact with the impact sound sensor. The impact sound sensor can be contacted via these connections, thereby establishing an electrically conducting and signal-transferring connection to the evaluating electronics of the ultrasound sensor and the following elements. Extra wiring of the impact sound sensor can thus be waived.

With a method for recording at least one contact event on a vehicle, in particular a motor vehicle, with at least one impact sound sensor for detecting at least one impact sound signal, in particular with a sensor device according to the invention and with at least one ultrasound sensor, provision is made according to the invention that an approximation of an object in direction of the vehicle or an approximation of the vehicle in direction of an object is detected by the ultrasound sensor and in that when an approximation is detected, the impact sound sensor is switched into a ready-to-receive state. Preferably the ultrasound sensor is an ultrasound distance sensor, for example the ultrasound distance sensor of a parking assistance system. These ultrasound distance sensors monitor the environment of a vehicle, in particular in the area of the bumpers and the mudguards. A reduction in the distance of an object to the vehicle, for example by an approximation of the vehicle in direction of the object or an approximation of the object in direction of the vehicle can be detected via the ultrasound distance sensors. The object may for example be a vehicle which is in the process of being parked. When an approximation is determined with the distance dropping below a minimum value, the sound sensor can be switched into a ready-to-receive state. Due to the approximation an occurrence of a contact event has become probable. Thereupon the outer shell of the vehicle may be selectively examined by means of an impact sound sensor for a contact event such as a minor damage due to a hit during parking. For example the outer shell of the vehicle, in which contact is expected, can also be selectively examined. Due to the detection, by the ultrasound distance sensors, of the approaching object and the monitoring, by the impact sound sensor, of the outer shell, a contact event can be confirmed twice, should an object come into contact with the vehicle outer shell.

Furthermore the invention relates to a vehicle, in particular a motor vehicle, with a sensor device according to the invention. Sensor devices according to the invention may be arranged for example in the area of ultrasound distance sensors of an already existing parking assistance system in the vehicle. It is therefore possible to subsequently equip the vehicle with impact sound sensors for monitoring contact events without increasing assembly costs.

Figure 2:
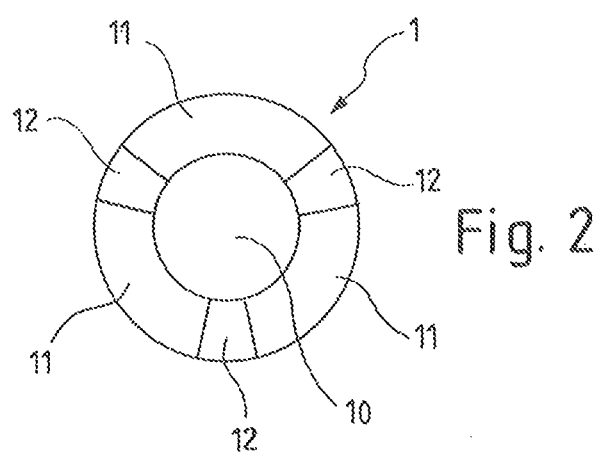
Figure 3:
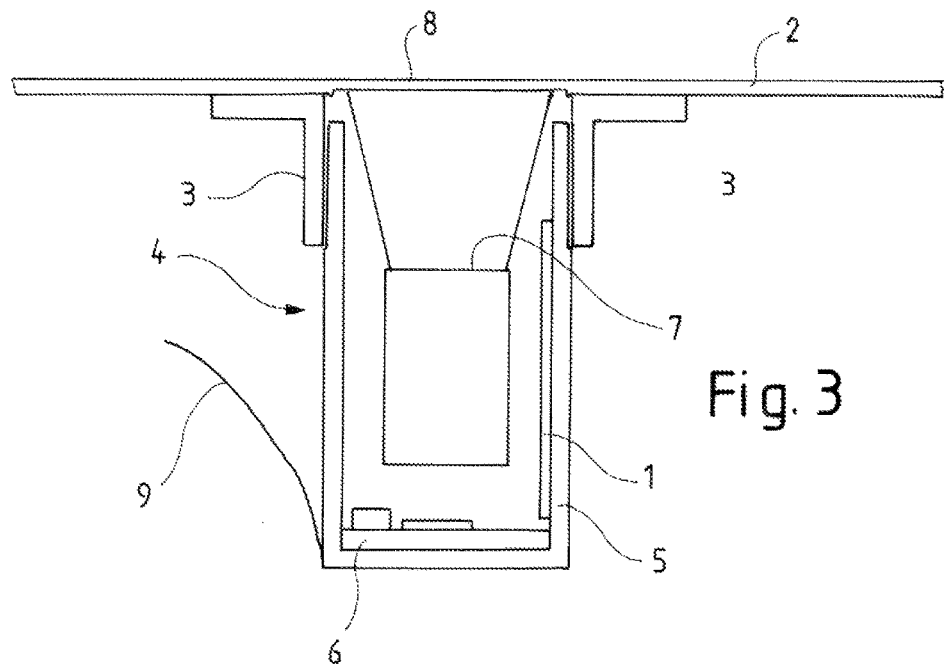
Figure 4:
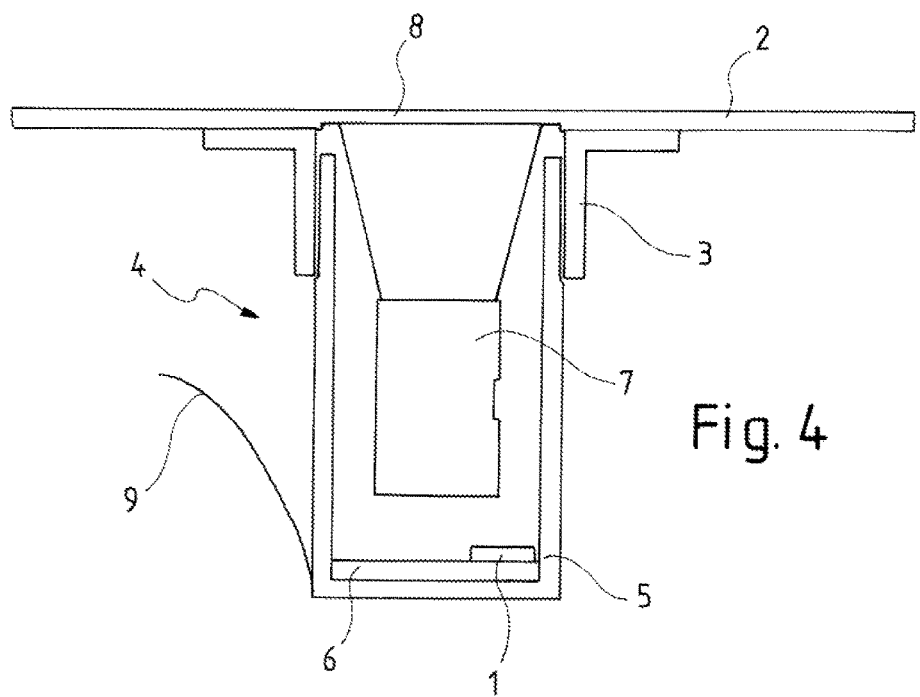
Figure 5:
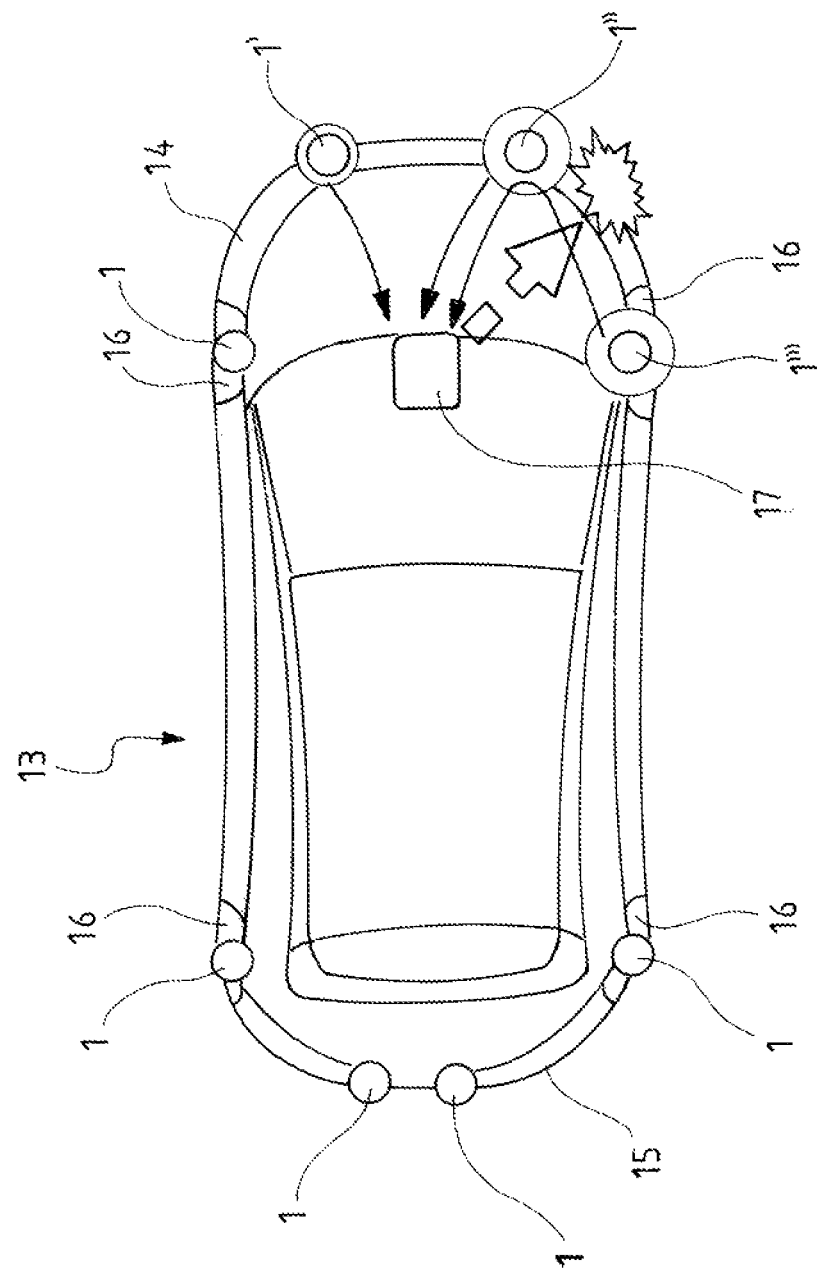

The invention will now be explained in detail by way of an exemplary embodiment shown in the drawing, in which FIG. 1 schematically shows a partially sectional view of a impact sound sensor arranged between the mounting of an ultrasound distance sensor and the outer shell of a vehicle, FIG. 2 schematically shows a view of an impact sound sensor, FIG. 3 schematically shows a partially sectional view of a impact sound sensor arranged on the inside of the housing part, FIG. 4 schematically shows a partially sectional view of a impact sound sensor arranged on the signal processing means, and FIG. 5 schematically shows, how the impact sound sensors are distributed in a motor vehicle.

FIG. 1 shows an impact sound sensor 1 arranged between the outer shell 2 of a motor vehicle and the mounting part 3 of an ultrasound distance sensor 4. The ultrasound distance sensor 4 is arranged on a housing part 5 and comprises a signal processing means 6, a piezo element 7 and a membrane 8 in the outer contour of the outer shell of the vehicle. The ultrasound distance sensor 4 together with its housing 5 is retained by the mounting part 3 on the inside of the outer shell 2 of the motor vehicle. The impact sound sensor 1 is arranged between the mounting part 3 and the inside of the outer shell 2. Therefore, an electrical contact (e.g., electrical contact 18) is established between the impact sound sensor 1 and the ultrasound distance sensor 4. The impact sound sensor 1 may for example be configured as a piezo-electric foil, which is self-adhesive on both sides so that the mounting part 3 is retained on the outer shell 2 by the piezo-electric foil. It is also possible for the impact sound sensor to be glued to the mounting part 3 and the outer shell 2. The impact sound sensor 1 is electrically contacted via the ultrasound distance sensor 4 and comprises a signal-transferring connection to the signal processing means 6 of the ultrasound distance sensor 4. Further the ultrasound distance sensor 4 comprises a wiring 9, via which respective measurement data of the impact sound sensor and the ultrasound distance sensor can be forwarded, for example to a data node point.

FIG. 2 shows an impact sound sensor 1 configured as a piezo-electric foil in a top view. The impact sound sensor 1 comprises a circular cross-section with a central opening 10, wherein the diameter of the opening 10 may e.g. be adapted to the diameter of the housing 5 of the ultrasound distance sensor 4. The impact sound sensor 1 comprises three sensorily active areas 11, which are spatially separated from each other by three sensorily inactive areas 12. The sensorily inactive areas 12 may, for example, be electrically conductive areas, which are used for contacting the impact sound sensor 1. The mounting part 3 of the ultrasound distance sensor 4 may also comprise electrically conductive areas in corresponding regions, so that the impact sound sensor 1 can be electrically contacted via the ultrasound sensor 4, in case these are brought in contact with each other. Due to the spatial separation of the sensorily active areas 11 the direction of the impact sound signal may e.g. be determined.

FIG. 3 shows an ultrasound distance sensor according to FIG. 1. Identical components are marked with the same reference symbols. In this embodiment the impact sound sensor 1 is attached to the inside of the preferably cylindrically shaped housing part 5 of the ultrasound distance sensor 4. The mounting part 3 constitutes an impact-sound-transferring connection of the housing part 5 to the outer shell 2 of the motor vehicle. Due to mounting the impact sound sensor to the inside of the housing part 5, the impact sound caused for example by a contact event on the outer shell can be recorded. This represents an especially simple way of mounting the impact sound sensor 1, and one which is also suitable for subsequent installation in an existing motor vehicle.

FIG. 4 shows an ultrasound distance sensor according to FIG. 3. Identical components are marked with the same reference symbols. In this embodiment the impact sound sensor 1 is mounted on the signal processing means 6 of the ultrasound distance sensor 4. The signal processing means 6 is attached to the inside of the housing part 5. Due to the impact-sound-transferring connection of the housing part 5 via the mounting part 3 with the outer shell 2, the signal processing means 6 is also connected in a impact-sound-transferring manner with the outer shell 2. A impact sound signal triggered on the outer shell 2 is thus transmitted via the housing part 3 and the signal processing means 6 to the impact sound sensor 1.

FIG. 5 shows the distribution of the ultrasound distance sensor 4 with the impact sound sensors 1 connected to it in a motor vehicle 13. The ultrasound distance sensors are arranged in the front bumper 14, the rear bumper 15 and the mudguards 16. In case of a contact event 17 on the front bumper 14, this is registered by the impact sound sensors 1', 1" and 1''', and a signal is sent via the wiring 9 to a central computer means 17.

All features cited in the above description and in the claims can be combined selectively at random with the features of the independent claim. Disclosure of the invention is thus not limited to the described/claimed feature combinations, rather all feature combinations meaningful in terms of the invention are considered to be disclosed.

The invention claimed is:

1. A sensor device for recording at least one contact event at a vehicle, comprising at least one impact sound sensor for detecting at least one impact sound signal, wherein the at least one impact sound sensor comprises at least one signal-transferring connection to at least one signal processing means associated with at least one other sensor means already existing in the vehicle, the at least one impact sound sensor comprises at least one impact-sound-transferring connection to at least one section of the outer shell of the vehicle, at least one already existing signal processing means is associated with at least one ultrasound sensor, the ultrasound sensor comprises at least one mounting part for attaching the ultrasound sensor in an area of the outer shell of a vehicle, the impact sound sensor is arranged between the mounting part and the outer shell of the vehicle, and the impact sound sensor functions as a connecting material to connect the mounting part and the outer shell of the vehicle.

2. The sensor device according to claim 1, wherein the at least one impact sound sensor comprises at least one impact-sound-transferring connection to at least one bumper and/or one mudguard of a vehicle.

3. The sensor device according to claim 1, wherein the ultrasound sensor comprises at least one housing part, in that the housing part comprises an impact-sound-transferring connection to the outer shell of the vehicle and in that the impact sound sensor comprises an impact-sound-transferring connection to the housing part.

4. The sensor device according to claim 1, wherein the at least one impact sound sensor is formed from a piezo-electric foil and in that the piezo-electric foil comprises at least two spatially separated areas, wherein at least one of the spatially separated areas is sensorily active.

5. The sensor device according to claim 1, wherein the at least one impact sound sensor comprises a rotation-symmetric cross-section and in that sensorily active areas and sensorily inactive areas are arranged on the cross-section in an alternating manner.

6. The sensor device according to claim 1, wherein the impact sound sensor comprises at least one electrically contactable surface, in that the ultrasound sensor comprises an electrically contactable area and in that an electric contact is established between the impact sound sensor and the ultrasound sensor.

7. A motor vehicle, with the sensor device according to claim 1.

* * * * *